Patented Mar. 17, 1953

2,631,992

UNITED STATES PATENT OFFICE 2,631,992

LINEAR POLYAMIDE FROM DISUBSTITUTED MALONIC ACID AND PROCESS

Stanley Brooke Speck, Buffalo, N. Y., assignor to E. I. du Pont de Nemours & Company, Wilmington, Del., a corporation of Delaware No Drawing. Application February 11, 1949, Serial No. 75,967

8 Claims. (Cl. 260—78)

This invention relates to new compositions of matter and more particularly to the preparation of novel, heat-stable, high molecular weight, linear polyamides.

In general, despite the fact that various disclosures in the art state that high molecular weight polyamides can be prepared from malonic acids and various of its esters as the dibasic acid reactant, such materials are not commercially useful. The reason for this is that since the monomeric dibasic acid reactant tends to decarboxylate at the temperature of condensation, they do not reach a high enough degree of polymerization to form commercially useful textile fibers and the polyamides formed are not heat stable at high temperatures. Moreover, it has been generally understood in the art that highly substituted dibasic acids react with diamines to yield polymers which, at ordinary temperatures, are viscous liquids obviously not suited for the production of fibers.

An object of this invention is to provide novel, heat-stable, fiber-forming, linear polyamides.

Another object is to prepare novel high-molecular weight, fiber-forming polymers from esters of highly substituted dicarboxylic acids. These and other objects will more clearly appear hereinafter.

The objects are accomplished by the present invention, which briefly stated comprises reacting an aliphatic diamine of the formula

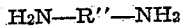

in which R'' is a saturated aliphatic divalent hydrocarbon radical having at least four carbon atoms separating the amine groups, with a di-substituted malonic acid ester of the general formula:

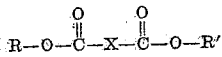

wherein R and R' are monovalent hydrocarbon radicals from the group consisting of alkyl and aryl radicals, and X is a divalent hydrocarbon radical from the group consisting of dialkylmethylene, diarylmethylene, alkyl-aralkylmethylene, aryl-aralkylmethylene, diaralkylmethylene, alkyl-arylmethylene, cyclopentylidene and cyclohexylidene radicals. The reactants are heated initially in a closed vessel under pressure until the diester and diamine are fixed to prevent the loss of diamine. The reaction is continued at atmospheric pressure at a temperature of 200–300° C. under an atmosphere of nitrogen, finishing up the condensation in the same temperature range under vacuum with agitation. The reduced pressure is used to speed up the removal of the residual volatile condensation product. By this means there is obtained a high molecular weight, heat-stable, fiber-forming, linear polyamide comprised of recurring structural units having the following general formula:

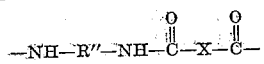

in which R'' and X have the significance hereinabove stated. As indicated above, this result is contrary to the expectations, based upon prior art knowledge, and hence is most surprising.

Any diester of a disubstituted malonic acid corresponding to the hereinabove defined general formula may be used to prepare the polyamides of this invention. Representative examples of such diesters are phenyl dimethylmalonate (diphenyl ester of dimethylmalonic acid), phenyl pentamethylenemalonate (diphenyl ester of cyclohexylidene-1,1-dicarboxylic acid), phenyl di-n-butylmalonate (diphenyl ester of di-n-butylmalonic acid), phenyl n-butylethylmalonate (diphenyl ester of n-butylethylmalonic acid), phenyl tetramethylenemalonate (diphenyl ester of cyclopentylidene-1,1-dicarboxylic acid), and n-butyl phenylethylmalonate (di-n-butyl ester of phenylethylmalonic acid).

Any aliphatic diamine corresponding to the formula NH$_2$—R''—NH$_2$ wherein R'' is a saturated aliphatic divalent hydrocarbon radical (including divalent aralkyl radicals) having at least four carbon atoms separating the amine groups is suitable to be used in connection with the di-substituted malonic diesters to form the polyamides of this invention. Representative specific diamines suitable for preparing the polyamides of this invention are: butylene 1-4 diamine, pentamethylenediamine, hexamethylenediamine, p-xylylenediamine, bis-p-aminoethyl benzene, cyclohexylenediamine, bis(p - aminocyclohexyl)methane, decamethylenediamine, etc.

A factor of considerable importance is the ratio of the di-substituted malonic diester to the diamine initially and at various stages of the reaction. If a large excess of diamine is used a monomeric intermediate will be formed which will have a relatively short molecular length bearing amine groups at each end. Similarly if a large excess of the diester is used the preponderant product will be a short molecule bearing acid groups at each end. If the product molecule is to be very long, as is desired for fiber-forming properties, it must, of course, be derived from almost exact equivalent amounts of diester and diamine. This does not mean, however, that in practice it will be necessary to have the diamine and the diester present in exact equivalent amounts initially in order to obtain molecules of very great length. Rather, it is preferred to have a slight excess of the diamine since part of the excess may be eliminated by volatilization and be lost to the reaction. This excess of diamine may amount to as much as 5%. However its exact excess will depend upon the volatility of the diamine used.

It is preferable to have the reaction proceed in three stages. The first part of the heating cycle to cause condensation should be carried out in a closed vessel to prevent the loss of the diamine. This is especially necessary in the case of the lower molecular weight diamines such as tetramethylenediamine and hexamethylenediamine, while not as essential in the case of the higher molecular weight diamines such as decamethylenediamine. The temperature at which this initial partial condensation is carried out may be in the range of 180 to 250° C. with the range 200 to 225° C. preferred.

The second stage of the reaction during which most of the condensation occurs is preferably carried out at atmospheric pressure under a blanket of oxygen-free nitrogen. During this period of heating most of the volatile by-product of the condensation reaction is removed. This phase may be carried out between 200 and 300° C. with the range 260 to 285° C. preferred.

The third stage of the reaction is preferably a vacuum stage to remove the residual amount of volatile condensation product as completely as possible and force the reaction to completion. The temperature of the reactants during this stage will normally be 200–300° C. with a range 260–285° C. preferred.

Agitation during the vacuum cycle is very helpful since it aids in the condensation and also in the removal of the residual volatile condensation product from the viscous mixture. While mechanical stirring may be used, a more convenient method is to bubble an oxygen-free inert gas such as nitrogen, through the reactants.

In general it is desired to exclude moisture throughout the various reaction cycles. The reason for this is that water tends to hydrolyze the diester and the free malonic acid and at the high temperatures used for the condensation reaction, the acid tends to decarboxylate liberating carbon dioxide.

While the polyamides of this invention are resistant to oxidation, nevertheless, at the high temperatures used in their preparation (e. g. 200–300° C.) they show some tendency to become discolored in the presence of air. For this reason it is desirable to exclude air or to limit the access of air during preparation. This may be done by the usual methods e. g. by operating in a closed vessel during the early stages of reaction, or if an open vessel is used by providing a stream of inert gas. An additional advantage of operating under diminished pressure (such as in the final stage of reaction) is the fact that this greatly cuts down the incidence of air. It is helpful in some cases to add antioxidants to the reaction mixture to inhibit the discoloration of the polymeric material.

In general no added catalysts are required in the above described processes of the present invention. It should be mentioned, however, that the surface of the reaction vessel (e. g. glass) appears to exercise a certain degree of catalytic effect in many cases. Added catalysts may, of course, be used to advantage in many instances. Examples of such materials are inorganic materials of alkaline reaction such as oxides and carbonates, and acidic materials such as halogen salts of polyvalent metals.

The following examples of certain preferred embodiments further illustrate the principles and practice of this invention. Parts and percentages are by weight unless otherwise indicated.

Example I 4.3 parts of pure, dry, freshly distilled hexamethylene diamine and 10.5 parts of dry phenyl dimethylmalonate are placed in a polymerization tube. The polymerization tube is formed of an ordinary piece of Pyrex tubing 25 mm. O. D. and 8½″ long, closed at one end and the other end sealed to a 9″ piece of 10 mm. tubing. The tube is flushed out carefully with dry oxygen-free nitrogen, evacuated and sealed. The tube and contents are heated for 3 hours at 200° C. After allowing the tube to cool, it is opened and then connected to a polymerization apparatus of such design that the contents of the tube can be heated in an atmosphere of pure nitrogen and, when required, in a vacuum. The polymerization tube and contents are then heated for 1½ hours at 259° in an atmosphere of dry, pure, oxygen-free nitrogen. During this time phenol distilled off and the clear colorless melt thickened. The temperature is then raised to 273° C. and the pressure reduced to 14 mm. After one hour the pressure is reduced to 1 to 2 mm. and the polymer heated at 273° C. for 5 hours. During this time, pure, oxygen-free nitrogen is bubbled slowly through the melt by means of a glass capillary. The polymer after cooling is a clear, pale yellow, hard and tough solid. The intrinsic viscosity (as defined in U. S. Patent No. 2,190,770) is 0.93. The polymer softened at 117°. It can be melt spun readily at 180° C. by extruding the molten polymer through a spinneret. The resulting fiber is readily drawn to 5 times its original length at 45–50° C. The drawn fiber has a dry tenacity of 2.1 g./d. (47.5% elongation) and a wet tenacity of 1.45 g./d. (50.5% elongation). The zero strength temperature [1] is 153° C.

Example II

A charge of 4.7 parts of hexamethylenediamine and 13.2 parts of phenyl pentamethylenemalonate (equivalent amount) is placed in a polymerization tube which is flushed out with pure, dry, oxygen-free nitrogen, evacuated and sealed. The tube and contents are heated for 3 hours at 210° C. After cooling, the tube is opened and attached to the polymerization apparatus. The charge is then heated for one hour at 273° C. in nitrogen at atmospheric pressure. During this time phenol distilled off leaving a clear viscous melt. The polymerization is completed by heating the material at 273° C. for 5 hours at 1–2 mm. pressure, during which time nitrogen is bubbled through the melt by means of a capillary. The polymer obtained is colorless semi-opaque, fairly hard and tough and has an intrinsic viscosity of 0.63. Its softening temperature is 193–197° C. The polymer is readily melt spun into both multifil and monofil fibers, which when oriented by drawing 4–5 times their original length at a temperature of 70–80° C. are strong, tough and re-

---

[1] Zero strength temperature is defined as follows:
Fibers: The temperature at which a yarn breaks while being held over a roll used as the heating member under a load as follows:
$$\text{Load (gms.)} = 9.74 \times 10^{-4} \times \text{denier}$$
Films: Same as for fiber except that the load is computed for a strip of film .25 in. wide:
$$\text{Load (gms.)} = 1.7 \times \text{mils (thickness)}$$

silient. The zero strength temperature of these fibers is 200° C.

In comparison with ordinary nylon, the fibers of this example resemble wool in having much higher work recovery from elongations of 0.5, 1.0 and 2.0%. Also the modulus ratio is high and similar to wool, being in the range of 4–6, rather than 1–2, as for ordinary nylon. The modulus ratio is the ratio of the initial slope of the stress-strain curve to the average slope from the origin to the breaking point of the fiber. One of the reasons why a high modulus ratio is desirable is that fabrics can be made having crisp hand without being harsh and boardy. In these respects, fibers of this example are resilient in the way that wool is resilient as contrasted with previously known polyamides.

*Example III*

A polymerization tube is charged with 5.9 parts of pure, dry redistilled hexamethylenediamine and 18.6 parts of dry phenyl di-n-butylmalonate. In the manner already described, this material is given a sealed tube stage of 5 hours at 210° C., heated for 1 hour at 265° C. in nitrogen at atmospheric pressure, followed by a 5 hour stage at 265° C. and 1-2 mm. pressure during which time nitrogen is bubbled through the clear viscous melt by means of a glass capillary. The resulting polymer is clear, pale yellow and quite tough and strong. It has an intrinsic viscosity of .66 and a softening temperature of 139–142° C. The polymer may be melt-spun to form clear lustrous fibers which when oriented by drawing at 60–70° C. are quite strong and resilient.

*Example IV*

3.3 parts of purified dry tetramethylene diamine and 10.6 parts of dry phenyl dimethylmalonate are sealed in a tube as described in Example I and heated at 210° C. for three hours. The cooled tube is opened, flushed with purified oxygen-free nitrogen and heated for 10 mins. at 270° C. at atmospheric pressure followed by 2 hours at 273° C. at a pressure of less than 3 mm. After cooling the mass under a blanket of oxygen-free nitrogen, a pale tan solid possessing an intrinsic viscosity of 0.86 and a softening temperature of 244° C. is obtained. The polymer is quite tough and can be spun into yarn. The polymer is melt cast into a film at 260° C. This film is decidedly fire-resistant inasmuch as it will not even burn under applied flame.

*Example V*

In a manner similar to that described in Example IV, 4.7 parts of tetramethylene diamine and 17.4 parts of dry phenyl pentamethylenemalonate are polymerized by heating the sealed tube at 210° C. for 2.5 hours followed by heating at atmospheric pressure and 300° C. for 10 minutes. A vacuum of less than 5 mm. is then applied and heating continued at 273° C. for 6 hours. A polymer of intrinsic viscosity 0.49 and having a softening temperature greater than 300° C. is obtained.

*Example VI*

9.1 parts of bis(p-aminoethyl) benzene and 15.8 parts of phenyl dimethylmalonate are heated in an evaporator tube at 210° C. for 5 hours. The charge is then heated 1 hour at 273° C. in nitrogen at atmospheric pressure, ½ hour at 273° C. and 14 mm. pressure, and 5 hours at 273° C. and 2 mm. pressure. The polymer is clear, pale yellow and can be spun into fibers which can be cold drawn. Intrinsic viscosity is 0.51 and the softening temperature is 115° C.

Both low polymers whose molecular weights probably lie in the neighborhood of 1000 to 4000 and high polymers with molecular weights probably in the neighborhood of 10,000 to 20,000 may be prepared from the polyamides of this invention. The most important distinction between these two types is that the high molecular weight polymers, i. e., polymers having an intrinsic viscosity of at least 0.45, are readily spun to strong continuous pliable permanently oriented yarns, while those prepared from low polymers do not have this fiber-forming property. The low polymers, however, are useful for other purposes than conversion into polyamides particularly suitable for fiber formation, inasmuch as such polymeric materials may be used as ingredients in coating and molding compositions.

The high molecular weight polyamides of this invention are all capable of being spun into continuous filaments. The spinning may be carried out by any one of several methods. The polyamide may be dissolved in a suitable solvent and the solution extruded through orifices into a coagulating bath, the resulting filaments being continuously collected on a suitable revolving drum or spindle. Or again the extruded solution may be passed through a heating chamber where solvent is removed by evaporation. The properties of these polyamides also make it possible to spin the molten material directly without addition of any solvent or plasticizer. A preferred process for the formation of continuous filaments is to extrude the molten polyamide through orifices and continuously collect the extruded filaments on a rotating drum. The fineness of the filaments may be controlled by varying the temperature of the molten polymer, the amount of pressure applied, the size of the orifices and the rate of reeling.

The polyamides of this invention in common with other high molecular weight polyamides have the ability to accept a very high degree of orientation under stress. Filaments obtained by spinning polyamides under such conditions that very little stress is applied closely resemble the polymer from which they are drawn. An X-ray examination shows that they have an X-ray crystalline polymer diffraction pattern. By the application of moderate stress at ordinary temperature these filaments can be elongated or cold drawn as much as 200-500%. This cold drawing is accompanied by progressive increase in tensile strength until a definite limit is reached, beyond which the application of additional stress causes the fiber to break. The cold drawn fibers remain permanently extended, they are much stronger than the material from which they were prepared, they are more pliable and elastic and on examination by X-ray they furnish a sharp fiber diffraction pattern, proving that the fibers are oriented.

As examples of suitable solvents that are useful in the dry or wet spinning or casting of various of the polyamides of this invention, the following may be mentioned: phenol, chloroform-methanol (88:12 by weight), Tri-Clene-methanol (64:36 by weight), ethyl alcohol, meta-cresol, etc. Such solvents are also useful as plasticizers for the formation of moulded articles from these polyamides.

The new polyamides of this invention prepared from disubstituted malonic esters and aliphatic diamines are very useful for many purposes. They can be obtained in high molecular weights, something that was not previously possible using the malonic acid and esters of the prior art. In addition the polymeric materials prepared as described herein are heat stable at very high temperatures. The heat stability of these polyamides is further demonstrated by their ability to withstand the high temperatures necessary during the polymerization cycle without discoloring or otherwise decomposing. Polyamides containing a malonic acid residue as prepared by the prior art, were not heat stable but had a tendency to gel and form viscous non-fiber forming liquids. However, polyamides prepared with disubstituted malonic esters as described herein do not gel; they form high molecular weight fiber-forming polymeric materials that are clear (in the amorphous state) and relatively colorless.

Heretofore it has not been possible to form strong fibers, films, and molded articles from malonic acid-containing polyamides. However, the materials described herein form eminently useful textile yarns, films, etc. which are not subject to the instability that personified polyamides made from malonic acid. Additionally, since there are several excellent solvents for various of the polymeric materials described herein they can be easily shaped by the conventional dry or wet spinning and casting procedures. Their solubility in certain organic solvents also makes them useful as coating compositions where their solubility and general inertness gives them added properties not usually obtained in soluble coating materials.

As many widely different embodiments may be made without departing from the spirit and scope of this invention it is to be understood that said invention is in no way restricted except as defined in the appended claims.

I claim:

1. A process which comprises heating to polymerization temperature a substituted malonic acid ester having the formula:

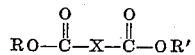

wherein R and R' are monovalent hydrocarbon radicals from the group consisting of alkyl and aryl radicals, and X is a divalent hydrocarbon radical from the group consisting of dialkylmethylene, diarylmethylene, alkyl-aralkylmethylene, aryl-aralkylmethylene, diaralkylmethylene, alkyl-arylmethylene, cyclopentylidene and cyclohexylidene radicals, and a diamine having the formula:

$$H_2N-R''-NH_2$$

wherein R'' is a saturated aliphatic divalent hydrocarbon radical having at least four carbon atoms separating the amine groups, and continuing the heating until a polymer of the desired molecular weight is produced.

2. A process which comprises heating together in an inert atmosphere and under substantially anhydrous conditions substantially equimolecular proportions of a substituted malonic acid ester having the formula:

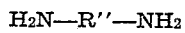

wherein R and R' are monovalent hydrocarbon radicals from the group consisting of alkyl and aryl radicals, and X is a divalent hydrocarbon radical from the group consisting of dialkylmethylene, diarylmethylene, alkyl-aralkylmethylene, aryl-aralkylmethylene, diaralkylmethylene, alkyl-arylmethylene, cyclopentylidene and cyclohexylidene radicals, and a diamine having the formula:

$$H_2N-R''-NH_2$$

wherein R'' is a saturated aliphatic divalent hydrocarbon radical having at least four carbon atoms separating the amine groups, to effect condensation thereof, and thereafter heating the resulting product at a temperature of from 200° to 300° C. to effect polymerization thereof.

3. The process of claim 2 wherein the polymerization is completed under a vacuum.

4. The process of claim 2 wherein the polymerization is completed under a vacuum and at a temperature of from 260° to 285° C.

5. A heat stable, fiber-forming polyamide consisting of recurring structural units of the following formula:

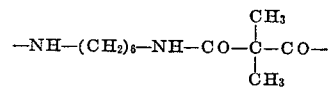

6. The process of claim 2 wherein the substituted malonic acid ester is the diphenyl ester of dimethylmalonic acid and the diamine is hexamethylenediamine.

7. A linear polyamide made by reacting a disubstituted malonic ester and an aliphatic diamine and consisting of recurring structural units of the following general formula:

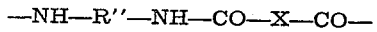

wherein R'' is a saturated aliphatic divalent hydrocarbon radical having at least four carbon atoms, and X is a divalent hydrocarbon radical from the group consisting of dialkylmethylene, diarylmethylene, alkyl-aralkylmethylene, aryl-aralkylmethylene, diaralkylmethylene, alkyl-arylmethylene, cyclopentylidene and cyclohexylidene radicals.

8. A heat-stable, fiber-forming polyamide made by reacting a disubstituted malonic ester and an aliphatic diamine and consisting of recurring structural units of the following general formula:

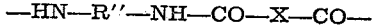

wherein R'' is a saturated aliphatic divalent hydrocarbon radical having at least four carbon atoms, and X is a divalent hydrocarbon radical from the group consisting of dialkylmethylene, diarylmethylene, alkyl-aralkylmethylene, aryl-aralkylmethylene, diaralkylmethylene, alkyl-arylmethylene, cyclopentylidene and cyclohexylidene radicals, said polyamide having an intrinsic viscosity of at least 0.45.

STANLEY BROOKE SPECK.

REFERENCES CITED

The following references are of record in the file of this patent:

UNITED STATES PATENTS

| Number | Name | Date |
|---|---|---|
| 2,130,523 | Carothers | Sept. 20, 1938 |
| 2,461,495 | Floyd | Feb. 8, 1949 |

FOREIGN PATENTS

| Number | Country | Date |
|---|---|---|
| 889,344 | France | Jan. 6, 1944 |